US008554247B2

(12) United States Patent
Heikkilae et al.

(10) Patent No.: US 8,554,247 B2
(45) Date of Patent: *Oct. 8, 2013

(54) METHOD AND SYSTEM FOR REFINING ACCURACY OF LOCATION POSITIONING

(75) Inventors: Timo Heikkilae, Hyvinkaeae (FI); Anssi Jakorinne, Turenki (FI); Timo Kuisma, Turenki (FI); Jyrki Paananen, Hyvinkaeae (FI); Arno Hietanen, Helsinki (FI)

(73) Assignee: Glopos FZC, Dubai (AE)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,730

(22) Filed: Sep. 13, 2012

(65) Prior Publication Data

US 2013/0079039 A1   Mar. 28, 2013

Related U.S. Application Data

(63) Continuation-in-part of application No. 12/618,063, filed on Nov. 13, 2009, now Pat. No. 8,295,853.

(30) Foreign Application Priority Data

Nov. 13, 2008  (WO) .................. PCT/FI2008/050656

(51) Int. Cl.
    *H04W 24/00*  (2009.01)

(52) U.S. Cl.
    USPC .................. 455/456.1; 455/456.6; 455/422.1

(58) Field of Classification Search
    None
    See application file for complete search history.

(56) References Cited

U.S. PATENT DOCUMENTS 6,941,145 B2 * 9/2005 Ogino et al. ............... 455/456.1
2001/0022558 A1 * 9/2001 Karr et al. ..................... 342/450
2001/0024957 A1 * 9/2001 Kawamoto .................... 455/456
2004/0104841 A1 * 6/2004 Syrjarinne ................ 342/357.13
2004/0232277 A1 * 11/2004 Gehlot et al. ................. 244/3.19
2006/0178154 A1 * 8/2006 Farmer ........................ 455/456.1
2007/0049286 A1 * 3/2007 Kim et al. .................. 455/456.1
2008/0096578 A1   4/2008 Lin et al.
2009/0203394 A1 * 8/2009 Shaffer et al. ................. 455/525

FOREIGN PATENT DOCUMENTS

WO    WO 2006/043123    4/2006

OTHER PUBLICATIONS

International Search Report for International Patent Application No. PCT/FI2008/050656 dated Sep. 1, 2009.

* cited by examiner

*Primary Examiner* — Kamran Afshar
*Assistant Examiner* — Marisol Fahnert
(74) *Attorney, Agent, or Firm* — Pearl Cohen Zedek Latzer Baratz, LLP

(57) ABSTRACT

To accurately determine the location of mobile device a multi-phase procedure incorporating mapping and location determination phases is suggested, wherein covered area estimation comprises (i) estimation of base station location, (ii) estimation of transmission range, (iii) estimation of signal map and/or (iv) estimation of area type. The actual location of the mobile device (10) is determined from the covered area estimation based on relative comparison between the actual environment data and estimations (i)-(iv) and weight numbers resulted from the comparison. During the both phases a database is stored in server (14) and updated whenever new environment data is received. The vertical position, or 'elevation', of mobile device is further estimated based on vertical level information associated with the covered area estimations during the mapping phase.

27 Claims, 7 Drawing Sheets

US 8,554,247 B2

METHOD AND SYSTEM FOR REFINING ACCURACY OF LOCATION POSITIONING

CROSS-REFERENCE TO RELATED APPLICATIONS

This application is a continuation-in-part of U.S. patent application Ser. No. 12/618,063, filed Nov. 13, 2009, now U.S. Pat. No. 8,295,853 which claims foreign priority of PCT International Application No. PCT/FI2008/050656, filed Nov. 13, 2008, both entitled "METHOD AND SYSTEM FOR REFINING ACCURACY OF LOCATION POSITIONING", the specifications of both of which are hereby incorporated by reference.

TECHNICAL FIELD OF THE INVENTION

This invention relates generally to a method and system for determining the location of the mobile device comprising mobile positioning technology. More particularly the invention relates to a method and system for accurately determining the location of the mobile device in which the location positioning is refined by environment data received through wireless cellular communication network and optionally from external databases.

BACKGROUND OF THE INVENTION

Location tracking devices and other such mobile terminals typically comprise satellite-based location determination functionality, e.g. a receiver for global positioning system (GPS) or GLONASS (Global Navigation Satellite System) and to some extent cellular communication functionality, e.g. transceiver for collecting cell data from nearby cells/base stations and reporting it to a receiver at the remote location. To determine a location, a GPS receiver must have current almanac data and ephemeris data for at least three appropriate satellites and the receiver must have an initial estimate of its location. However, the reception of signals from the satellites easily suffer from interruptions caused by landscape obstructions such as geographic features, buildings, trees, etc. Because location tracking devices are often operated in environments, such as cities and urban areas, wherein GPS signal reception will be intermittent, this can result in poor performance of the location tracking system.

Documents WO 2008/080226, US 2008/0171557, EP 1548456 and U.S. Pat. No. 7,215,967 address the weaknesses of GPS-based location tracking devices and other such mobile terminals and propose assisted GPS (AGPS) to update the almanac and/or ephemeris data in order to improve performance of such devices. AGPS systems exploit remote terrestrial stations in locations in which good reception of satellite signals is expected and assistance data based on received signals are then transmitted e.g. via a cellular communication network to the mobile terminals. The start-up of the GPS-receiver typically requires the initial estimate of its location and this process takes several minutes (so called cold start time). In order to speed up the start-up of the GPS-receiver the cited documents present that the remote/mobile terrestrial stations produce assistance data based on identifiers of cellular network base stations and time delay data received from the cellular network base stations, and this data is used to improve the initial location position estimate. Time delay data which is available from the base station is used to estimate the distance between the location tracking device and the base station. To determine location estimates from the base station delay data, it is necessary to know the location of the base stations which is not always axiomatic due to security or other reasons. Finally, the location tracking device determines its location using the initial location estimation based on assistance data including identifiers, time delay data and valid GPS ephemeris data which it obtained from the remote terrestrial station. In the prior art systems the initial, actual and final location determination always requires reception of the satellite-based positioning data in each phase which is time consuming task.

The location estimation procedures described above take into account assistance data that includes ephemeris data received from satellites and identifier and time delay data from the cellular base stations. This easily results inaccurate location estimation because certain environment obstructions and their influences are ignored. The location estimation described above is based on performing an analysis of the location of the mobile terminal with respect to the locations of the base station and therefore if the exact base station locations are not available the resulting location estimation becomes distorted. The location estimation procedures described above do not estimate for each cell a location of a base station or a coverage area of the base station (area reached by the radio signal). The location estimation procedures described above don't make any estimation of a type of the cell with regard to landscape and cityscape, etc.

SUMMARY

In accordance with a first aspect of the invention there is provided a method for determining a location of a mobile device configured to receive and transmit further at least positioning data and wireless communication cell data, the method comprising calculating for each of a plurality of cells a covered area estimation based on the received positioning data and the received cell data, completing the covered area estimation with additional data associated to the received positioning data and the received cell data, wherein the additional data represents at least a shape of the covered area estimation, and wherein the covered area estimation incorporates vertical level information, receiving further actual cell data and relatively comparing the actual cell data to the cell data of the covered area estimation of each of the plurality of cells, selecting at least one cell from the plurality of cells having the actual cell data that matches to the cell data of the covered area estimation, and calculating the location of the mobile device through the utilization of the positioning data of the covered area estimation of each selected cell, wherein an estimate of the vertical position of the mobile device is further determined.

In an embodiment of the method of the invention completing comprises updating the cell data of the covered area estimation with the additional data that relates to the shape of the covered area estimation based on probability of signal strength within each of the plurality of cells. For example, the additional data comprises a piece of information received along environment data including cell data and/or a piece of information received along external environment data including cell data.

In an embodiment of the method of the invention calculating the covered area estimation comprises calculating a location of a transmitting base station of each cell. It further comprises dividing each of the plurality of cells into sector areas and calculating for each sector area a sector formula representing signal strength levels inside the sector area and accumulating the covered area estimation from the sector formulas.

In an embodiment, the covered area estimation comprises vertical level information indicative of e.g. topography and/or vertical level(s) associated to the cell. At least part of the vertical level information may be based on the received positioning data indicative of the vertical level, such as GPS altitude information typically determined in relation to the WGS 84 reference ellipsoid. Alternatively or additionally, external databases or other sources may be utilized to obtain and/or supplement vertical level information. E.g. ground level(s) indications associated with the cells either directly or via applicable linkage factors, such as coordinates linkage, may be obtained for the cells relative to predetermined reference such as mean sea level. In some embodiments, higher resolution, e.g. sector area and/or probability area (for signal strength)-specific, vertical level information may be associated with a cell. Further, a level range may be associated with each cell and/or higher resolution—providing entity such as a related sector area or probability area.

In an embodiment, multiple wireless communication technologies are cooperatively applied in positioning. Applicable wireless technologies include GSM, WCDMA and WiFi-based technologies, for instance. Concerning each technology, modelling may take place and preferably the built models such as probability models indicative of e.g. probability such as probability areas for signal strength(s), are made mutually compatible, whereupon hybrid exploitation thereof is performed during the actual positioning phase. The models of highest accuracy and precision may be then given most weight regardless of their type of wireless technology, while the lower precision models can facilitate further refining the position estimate.

In an embodiment, positioning may even be executed by optionally solely analysing the Network Measurement Reports (NMR) or similar data. The data shall advantageously identify at least the serving cell and/or a number of neighbouring cells relative to the mobile device. The data may include at least one element selected from the group consisting of: MCC (Mobile Country Code), MNC (Mobile Network Code), LAC (Location Area Code), CID (Cell ID), ARFCN (Absolute Radio-Frequency Channel Number), BSIC (Base Station Identity Code), CPICH (Common Pilot Channel), and MAC (Media Access Control, MAC address). Preferably, however, the data includes several aforementioned elements. Acquiring signal strength information is beneficial to the positioning accuracy but nevertheless, not mandatory. Generally, more versatile NMR reports yield more accurate positioning results. By monitoring the reported cell-identifying data the location of the mobile device may be calculated. Likewise, substantially transparent operator-end positioning is made possible as the report data are transmitted from the mobile device(s) to the network typically automatically in any case depending on the system. Bounding volume hierarchies may be employed in the positioning procedure as explained hereinafter.

In an embodiment, positioning accuracy may be further enhanced by taking the movement of the mobile device into account through movement profiling. The cell data used for determining the models such as probability models relating to probability areas for signal strength are stored for a period of time and the probability areas regenerated from said data are modified based on the current movement profile indicated by elements such as velocity, direction, and/or time difference from a filter/estimator, optionally Kalman filter/estimator, to accommodate the potential changes in position. Combining the resulting modified models from earlier position fixes with the information of the current models allows for a higher accuracy position fix by achieving a higher removal rate of lower probability areas when the combined data is run through the locating algorithm.

In an embodiment of the invention there is provided a computer program comprising program code means adapted to perform any steps of method claims when the program is run on a processor.

In accordance with another aspect of the invention there is provided a system for determining a location of a mobile device, wherein
  the mobile device is configured to collect and transmit further at least positioning data and wireless communication cell data received from a plurality of base station belonging to at least one cellular network,
  a server is configured to receive and store the positioning data and the cell data of each of the plurality of base stations associated to the position data,
  the server is configured to calculate for each of the plurality of base stations a covered area estimation based on the positioning data and the cell data,
  the server is configured to complete the covered area estimation with additional data associated to the received position data and the received cell data, wherein the additional data represents at least a shape of the covered area estimation, and wherein the covered area estimation incorporates vertical level information,
  the server is configured to further receive the cell data and the processor is configured to relatively compare the actual cell data to the cell data of the covered area estimation of each of the plurality of base stations,
  the server is configured to select at least one base station from the plurality of base stations having the actual cell data that matches to the cell data of the covered area estimation,
  the server is configured to calculate the location of the mobile device from the positioning data of the covered area estimation of each selected at least one base station, wherein the location comprises an estimate of the vertical position of the mobile device, and
  the server configured to transmit further the location (indication) of the mobile device.

In accordance with a further aspect of the invention there is provided a module for determining a location of a mobile device, the module comprising
  a receiver configured to receive and a memory configured to store positioning data and cell data of each of the plurality of base stations associated to the position data,
  an estimator configured to calculate for each of the plurality of base stations a covered area estimation based on the positioning data and the cell data,
  a modeler configured to complete the covered area estimation with additional data associated to the received position data and the received cell data, wherein the additional data represents at least a shape of the covered area estimation, and wherein the covered area estimation incorporates vertical level information,
  a locator configured to further receive actual cell data,
  the estimator configured to relatively compare the actual cell data to the cell data of the covered area estimation of each of the plurality of base stations,
  a selector configured to select at least one base station from the plurality of base stations having the actual cell data that matches to the cell data of the covered area estimation, and the locator configured to calculate the location of the mobile device from the positioning data of the covered area estimation of each selected at least one base station, wherein the location comprises an estimate of the vertical position of the mobile device.

In an embodiment of the module of the invention the modeler is configured to complete the cell data of the covered area estimation with the additional data that relates to the shape of the covered area estimation based on probability of signal strength within each of the plurality of cells.

In an embodiment of the module of the invention the modeler is configured to calculate a location of a transmitting base station of each cell. Further in an embodiment of the module the modeler is configured to divide each of the plurality of cells into sector areas and calculate for each sector area a sector formula representing signal strength levels inside the sector area and accumulate the covered area estimation from the sector formulas.

In an embodiment, a mobile device may incorporate the module (or at least the locator thereof), which is herein primarily considered as a functional entity, to enable practically self-contained positioning actions. Alternatively, a network entity such as a server may comprise the module.

Still in a further aspect, a mobile device operable in at least one wireless communications network, comprises a model database containing a covered area estimation regarding a plurality of base stations of the at least one network, wherein the covered area estimation associates cell data with positioning data and indicates the shape of the covered area, further incorporating vertical level information, and a locator configured to receive cell data and further configured to relatively compare the received cell data to the cell data of the covered area estimation of each of the plurality of base stations, to select at least one base station from the plurality of base stations with matching cell data, and to calculate the location of the mobile device from the positioning data of the covered area estimation of each selected at least one base station, wherein the location comprises an estimate of the vertical position of the mobile device.

The previously presented considerations concerning the various embodiments of the method may be flexibly applied to the embodiments of the system, module, and mobile device mutatis mutandis and vice versa as being appreciated by a skilled person.

A typical benefit of the embodied invention is that it provides more accurate covered area estimation, base station location estimation and estimation of the type of the location area, and therefore more accurate location determination of the mobile device. Even 3D positioning is enabled by taking the available vertical level information into account during the mapping and subsequent positioning phases, whereupon the location of the mobile device can be determined also in terms of vertical position or 'height'.

Another common benefit of the embodied invention is that it provides more accurate and fast covered area estimation, since in the mapping phase, i.e. calculating estimation based on the positioning data and environment data including the cell data of each of a plurality of cells associated to the position data, it would be enough to map in the beginning only even a small part of the covered area of the base station in order to end up an estimation of the whole covered area, of the shape of the whole covered area and of the transmitting signal strength of the base station.

Still another likely benefit of the embodied invention is that it provides more accurate location determination of the mobile device, since relative comparison between the covered area estimation and the actual environment data puts emphasis on the covered area estimations, and consequently the base stations/cells they represent, that score the greatest accuracy as explained later. This also allows that effects caused by possible errors due to bad signal quality from part of the cells can be eliminated.

Still another potential benefit of the embodied invention is that it provides more accurate location determination of the mobile device, since the movement of the mobile device may be profiled and applied in the positioning through the dynamic adaption of the utilized cell-data based models applied for position fixes.

Still another potential benefit of the embodied invention is that it provides location determination of the mobile device even if only NMR-based data is available for positioning. The solution flexibly scales in response to the amount and nature of available data.

Still another potential benefit of the embodied invention is that it provides fast location determination of the mobile device. Since the further calculation of the covered area estimation, base station location estimation and estimation of the type of the location area is based on environment data including cell data received from the mobile device or on environment data including cell data received from the mobile device and external databases, there is no need to spent time for slow and unreliable satellite-based positioning data reception again once it has been done in the beginning of the process.

Still another potential benefit of the embodied invention is that it provides more accurate location determination of the mobile device, since it can exploit in addition to cell based data received from the base stations also external environment data from data bases and it can also deduce additional environment data from all the data that the mobile is configured to collect from nearby base stations.

Still another potential benefit of the embodied invention is that it provides a flexible location determination of the mobile device, since it can exploit cell data received from base stations from multiple network operators and/or data provided by multiple different network technologies, whereupon so-called hybrid positioning may be effectuated, making use of all technologies simultaneously for a result more accurate and reliable than any single one of the technologies could provide alone.

Still another potential benefit of the embodied invention is that it provides improved accuracy for location determination of the mobile device, since it carries out self-learning procedure by storing the positioning data and environment data including cell data that is collected during location determination procedure. Therefore, updated covered area models are available for the location determination. In this way an updatable database can be generated to parameters that refer to actual positioning data and corresponding environment data, and the database can be iterated by comparing each new environment data received to parameters already existing in the database. Further advantage of defining the covered area model according to an embodiment is that there is no need to store single positioning data with associated cell data to the model database and therefore memory and processing capacity is saved both in the mapping phase as well as in the actual location calculation phase.

Various embodiments of the present invention together with additional objects and different advantages will be best understood from the following more detailed description of specific embodiments when read in connection with the accompanying drawings.

The embodiments of the invention presented in this document are not to be interpreted to pose limitations to the applicability of the appended claims. The verb "comprise" or any other variation thereof is used in this document as an open limitation that does not exclude the existence of also unrecited features. The features recited in depending claims are mutually freely combinable unless otherwise explicitly stated. The terms "a", "an" and "at least one", as used herein, are defined as one or more than one. The term "plurality", as used herein, is defined as two or more than two. The terms "including" and "having", as used herein, are defined as comprising. The term "another", as used herein, is defined as at least a second or more. The terms "program", "computer program" and "computer instructions", as used herein, are defined as a sequence of instructions designed for execution on a processor.

BRIEF DESCRIPTION OF THE DRAWINGS

An embodiment of the invention will be described in detail below, by way of example only, with reference to the accompanying drawings, of which

DETAILED DESCRIPTION OF THE INVENTION

Figure 1A:
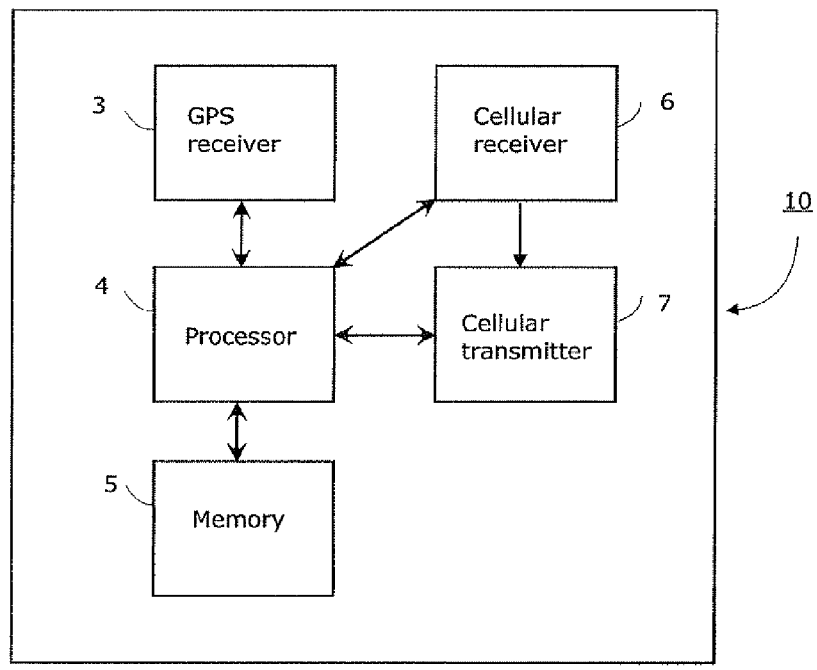
FIG. 1a depicts a block diagram of a mobile device according to an embodiment of the invention.

FIG. 1a shows a block diagram of a mobile device 10 according to an embodiment of the invention. The mobile device 10 may be e.g. a location tracking device or any other such device capable of indicating its present location upon request and/or continuously. The location of the mobile device 10 is monitored when it is moving or in stationary state. The mobile device 10 comprises first receiving means 3 for receiving positioning signals, e.g. satellite-based global positioning system (GPS) signals, and second receiving means 6 for receiving cellular communication network signals, e.g. GSM, GPRS, 3G, CDMA signals. Exemplary as shown in FIG. 1a, the first receiving means may comprise at least one GPS receiver 3 and associated antenna (not shown), and at least one cellular receiver 6 with associated antenna (not shown). The cellular receiver 6 may comprise one or more receiving means for different cellular communication networks and it is capable of receiving signals from cellular networks operated by different operators. The cellular receiver 6 and a cellular transmitter 7 are operable to communicate with a remote station 14 such as a server through a cellular communication network. The cellular transmitter 7 is operable to transmit data from the mobile device 10 to the remote station 14. The cellular receiver 6 and transmitter 7 may be integrated in a single component.

The mobile device 10 further comprises a processor 4 capable of controlling functions of the mobile device 10 and capable of performing steps of a stored program and program instructions received through the cellular receiver 6 and/or GPS receiver 3. The mobile device 10 may comprise a memory 5 capable of storing embedded stored programs and capable of storing data of signals received through GPS receiver 3 and cellular receiver 6. For example, positioning data such as GPS-provided latitude, longitude and/or elevation (altitude/vertical level) data may be acquired and stored. The processor 4 and the memory 5 can also be integrated together. The mobile device 10 may further comprise a sensor (not shown) for detecting certain environmental conditions inside or outside the mobile device. Components which combine functionality of any of the above mentioned elements may be used.

According to another embodiment the mobile device 10 comprises, instead of the first receiving means 3 for receiving satellite-based positioning signals, a third receiving means (not shown) configured to receive and collect information corresponding to positioning data, e.g. GPS coordinates. According to still another embodiment the mobile device 10 does not include the GPS receiver 3 and associated antenna, and it can be for example a GSM/GPRS, CDMA, or other cellular phone device which is configured to receive and collect the positioning data.

Figure 1B:
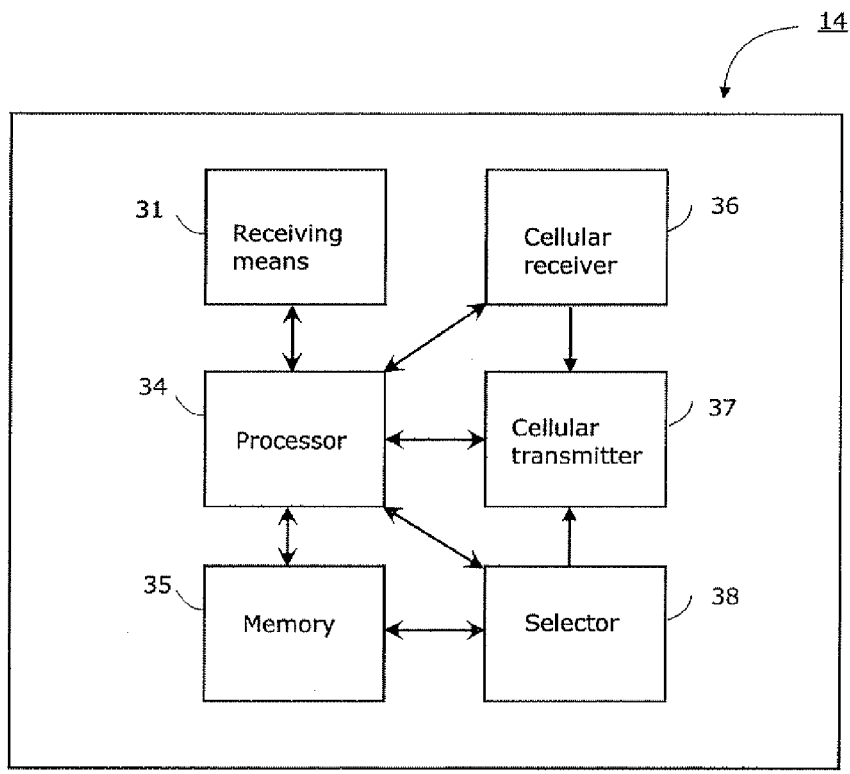
FIG. 1b depicts a block diagram of a module according to an embodiment of the invention.

FIG. 1b shows a block diagram of a server 14 or other such module according to an embodiment of the invention. The server 14 is connected to a cellular communication network, e.g. GSM, GPRS, 3G, CDMA, and it comprises first receiving means 36 to receive data from the mobile device 10 and transmitting means 37 to transmit data and/or program instructions to the mobile device 10. Exemplary as shown in FIG. 1b, the first receiving means may comprise at least one cellular receiver 36 with associated antenna (not shown) and at least one cellular transmitter 37 with associated antenna (not shown). Alternatively, the server 14 communicates with the mobile device 10 through a datanet, such as Internet, operating via the cellular communication network whereto the mobile device 10 is connected. The server 14 may further comprise receiving means 31 configured to receive data from external sources 19 such as external databases. The server 14 comprises a processor 34 capable of controlling functions of the server 14 and performing steps of a stored program and program instructions which relates to e.g. analysing of the location of the mobile device 10. The server 14 comprises a memory 35 capable of storing stored programs and capable of storing data of signals received through cellular receiver 36 and the receiving means 36. The processor 34 is also capable of accumulating memory means, such as the memory 35 or database (not shown), with each piece of new data that it receives through the cellular receiver 36 and the receiving means 36 of external data and process this accumulated data on an on-going basis in order to update and/or correct the server database. The processor 4 and the memory 5 can also be integrated together. The server 14 further comprises selecting means 38 for making selections according to instructions from the processor 34.

Figure 2:
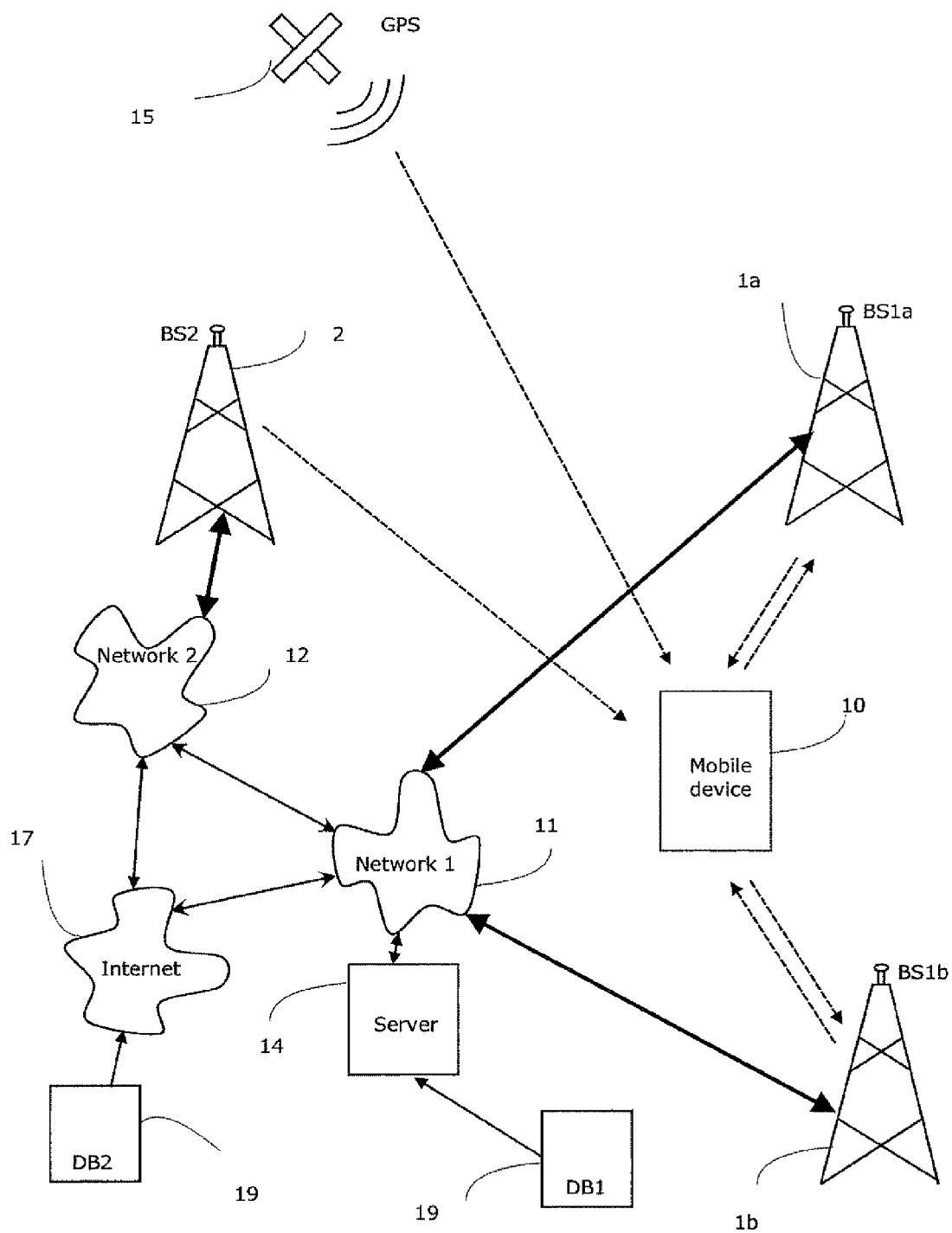
FIG. 2 depicts a schematic representation of a system according to an embodiment of the invention.

FIG. 2 shows a schematic view of a system according to an embodiment of the invention. The system comprises at least one mobile device 10, e.g. a location tracking device or other such mobile device that is operable in at least one cellular communication network 11 via one or more base stations 1a, 1b. The system also comprises base stations 2 from other data communication networks 12 operated by different operators and/or technologies. The mobile device 10 is capable of receiving signals from all nearby base stations 1a, 1b, 2. According to an embodiment the system also employs at least one satellite-based positioning system, e.g. GPS, via satellites 15, preferably at least three satellites 15. Alternatively, the system is configured to receive and use positioning data corresponding to such positioning system. As a further alternative, any feasible positioning system and/or related data may be utilized in connection with the present invention. The server 14 is connected to the cellular communication network 11 directly as shown in FIG. 2 or via another data communication network 17 such as Internet. The mobile device 10 is capable of transmitting and receiving data with the server 14. It is capable of reporting its location to the server 14 by transmitting positioning data received from the satellite 15 and it is also capable of transmitting environment data including cell data that it has been collecting from any of nearby base stations 1a, 1b, 2. The mobile device 10 reports this data upon request, continuously, at regular intervals or occasionally. The server 14 may store all the received positioning data and environment data e.g. in the memory 35. Further, the server 14 is capable of receiving external data from external databases 19 via receiving means 31. The external databases may be connected to the server 14 directly or through Internet 17 or other such data communication network.

In a system according to an embodiment of the invention, the mobile device 10 is configured to receive at least positioning data received from e.g. the satellite 15 of the satellite-based positioning system and at least cell data of wireless cellular communication network received from a plurality of base stations 1a, 1b, 2 belonging to at least one cellular communication network 11, 12. According to another embodiment the system, the mobile device 10 comprises, instead of the first receiving means 3 for receiving satellite-based positioning signals, a third receiving means (not shown) configured to receive and collect information corresponding to positioning data, e.g. GPS coordinates. According to still another embodiment the system, mobile device 10 does not include the GPS receiver 3 and associated antenna, and it can for example a GSM/GPRS, CDMA, or other cellular phone device which is configured to receive and collect the positioning data.

In the system in the beginning of the mapping phase, the mobile device 10 is configured to collect simultaneously the positioning data and the cell data associated to said positioning data. The mobile device 10 is configured to transmit further the collected positioning data and environment data including cell data at least to the server 14. In the following GPS is used as an example of the satellite-based signals and GSM as cell based signals. The positioning data, e.g. GPS coordinates, is received among e.g. the ephemeris data that the satellite 15 transmits. The environment data including cell data may comprise area identification data, such as mobile country code (MCC), mobile network code (MNC), local area code (LAC), cell identification (CID) and/or other such data, that the plurality of the base stations 1a, 1b, 2 transmit. The environment data including cell data may also comprise data relating to each of the plurality of the base stations/cells 1a, 1b, 2, such as receiver signal strength (RxLev), timing advance (TA), radio frequency (RF), absolute radio frequency channel number (ARFCN) and/or other such data, that the plurality of the base stations 1a, 1b, 2 transmit. This environment data including cell data is collected from each nearby base station 1a, 1b, 1c for each GPS position coordinates and then the mobile device 10 transmits it to the server 14. Instead of GPS position coordinates, corresponding positioning coordinates or data received from any other positioning system known in the art may be used. This applies throughout this description, since GPS coordinates are used only as exemplary position coordinates.

The server 14 comprises or is at least functionally connected with the cellular receiver 36 configured to receive the positioning data and environment data including cell data of each of the plurality of base stations 1a, 1b, 2 associated to the position data. The server 14 is configured to store this data as a database in the memory 35. Each new piece of received data is used to update the database in order to improve its accuracy. This new data can include environment data concerning physical changes in construction of base stations performed by the operator. The more the positioning data includes GPS coordinates for each base station/cell 1a, 1b, 2, the better estimations for location determination in the mapping phase can be expected. However, accurate estimation can be done even with a very limited number of coordinates. During the mapping phase the server 14 can improve the collected database so that it makes location determination tests by comparing the current database with currently received positioning coordinates and consequently optimizes its data parameters.

The server 14 comprises the processor 34 that is configured to calculate a covered area estimation for each of the plurality of base stations/cells 1a, 1b, 2 based on the positioning data and the environment data including the cell data that is stored in the memory 35. According to an embodiment the covered area estimation for each cell comprises at least some of the following calculations: (i) calculation of a location estimation of the transmitting base station 1a, 1b, 2, (ii) transmission range estimation, (iii) estimation of size and shape of the covered area, i.e. signal map of the area reached by the radio signal, and (iv) estimation of the area type. The estimation of size and shape of the covered area is based on data relating to each of the plurality of the base stations/cells 1a, 1b, 2, such as receiver signal strength (RxLev), timing advance (TA), radio frequency (RF), absolute radio frequency channel number (ARFCN), area type and/or other such data. In the estimation of size and shape of the covered area the updated database can be used to reshape the covered area estimation to meet the most recent accuracy, e.g. if the construction of base station is changed. In these mapping phase calculations also external data from external sources 19 (as described later) can be used to give extra accuracy to the covered area estimation calculations. In the covered area estimation the calculation of a location estimation of the transmitting base station 1a, 1b, 2, the transmitting range estimation (i.e. estimation of transmitting signal strength) and the estimation of size and shape of the covered area can be done even if just few GPS coordinates and cell data is available from a small part of the whole actual covered area. The updatable database of the server 14 and the external databases 19 can be used to serve as a basis for calculating the covered area estimation that accurately resembles the actual covered area in this case. In calculation of the estimation of area type the server 14 may use environment data including cell data that it receives from the mobile device 10. The environment data includes such data as signal loss over various ranges, signal loss over a certain distance, number of base stations, distribution (density) of base stations and types of base stations, etc. The environment data may include area type data such as area size, small/medium/big city, rural area, mountainous/hilly/flat area, emptiness area, etc. Further, in the calculation of the estimation of area type the server 14 may use environment data received from external sources 19. The environment data may also include such data as population density in the area, land topography in the area, city size, and other such information in order to integrate this data to calculations of the covered area estimation comprising (i) the location estimation of the transmitting base station 1a, 1b, 2, (ii) transmission range estimation, (iii) estimation of size and shape of the covered area, and (iv) estimation of area type.

At the end of the mapping phase there is achieved as a result of calculation steps (i)-(iv) the covered area estimation that is based on the positioning data and the environment data including cell data described above. The actual location determination phase as described below may follow the above described mapping phase or it can be a separate procedure that is performed one or more times using the positioning data and the environment data including cell data that is resulted from a separate mapping phase.

In some embodiments, mapping may be accompanied by vertical level (elevation/altitude/height) information, wherein the level may basically refer to any level on, above, or below the applied reference such as ground. The level information can be measured in building floors, meters, or any other measure of positive or negative height, for instance. When covered area estimations and e.g. cell model formulas are determined, vertical level information such as level range information may be included.

Vertical level, or vertical position/altitude, may indeed be generally indicated relative to a predetermined reference such as mean sea level (geopotential height)/geoidal level or other geodetic reference such as an ellipsoidal reference in accordance with a corresponding model, optionally GRS80 or WGS84 applied e.g. in connection with GPS altitude measurements. The vertical position of the mobile device may also be indicated relative to the reference ground level, i.e. ground level associated with the corresponding area.

E.g. the positioning data obtained and forwarded by the mobile device 10 towards the server 14 may include vertical level information in the form of GPS altitude data, for example. Alternatively or additionally, vertical level information may be obtained from various other sources such as optionally external databases.

In some embodiments, also hybrid positioning exploiting a plurality of wireless technologies may be utilized as mentioned hereinbefore. The server 14 may be configured to establish uniform (probability) models from multiple, preferably all available, wireless technologies (GSM, WCDMA, Wi-Fi, etc.) advantageously taking into account the physical characteristics of signal propagation including environmental variables affecting the signal, such as building sizes, street widths, base station placement, transmission power and frequency, and/or other information that can be either included in the mapping data samples or combined into more abstract variables formulated from the mapping samples. The applied mathematical formulas may be utilized to build mutually compatible free-form (probability) models for all monitored wireless technologies.

Upon proceeding to the actual location determination phase, the server 14 is configured to further receive actual environment data including cell data from the mobile device 10 that has collected the data in the same way as in the mapping phase, except that any positioning data, e.g. GPS coordinates, is not needed. In the actual location determination phase the accuracy of each piece of environment data including cell data of the covered area estimation resulting from the mapping phase is scored against the actual environment data including cell data that is received during the actual location determination phase. According to an embodiment of the invention in the processor 34 of the server 14 actual environment data, such as actual receiver signal strength (Rx-Lev), actual timing advance (TA), actual radio frequency (RF), actual absolute radio frequency channel number (ARFCN) and/or other such data, is compared in relation to individual steps of the covered area estimation (i) the location estimation of the transmitting base station 1a, 1b, 2, (ii) transmission range estimation, (iii) estimation of size and shape of the covered area, and (iv) estimation of area type. Comparing the actual environment data in relation to each step (i)-(iv) separately forms the basis for evaluating each step (i)-(iv) of the covered area estimation. This comparison reveals how much weight is worth putting to each step (i)-(iv). This allows emphasizing the covered area estimations of those cells whose all steps (i)-(iv) score best with the actual environment data. Less weight is put to those covered area estimations, and corresponding cells, that score badly, because they seem to be less accurate. These weights can be represented by weight numbers (e.g. percentage) and these weight numbers are used when calculating a final location determination. In this way emphasis can be put on the covered area estimations, and consequently the base stations/cells they represent, that give the greatest accuracy. This also allows that effects caused by possible errors due to bad signal quality from part of the cells can be eliminated. Such errors may arise for example in situation having lots of high buildings in one direction or being in the cellar. Due to the relative nature of the accuracy scoring, even if all signals are weakened (e.g. in the cellar), the errors even out each other still leading to a rather accurate calculation of the location determination. Also the external data from the external databases 19 can be used in the relative comparison described above. The actual location estimate of the mobile device 10 is determined from the covered area estimation based on relative comparison between the actual environment data and estimations (i)-(iv) and weight numbers resulted from the comparison.

The actual environment data including cell data that is received by the server 14 in the location determination phase is also stored in the memory 35 in order to update and/or correct the database comprising collected data as earlier described. The server 14 carries out self-learning procedure by storing the positioning data and environment data including cell data that is collected during the mapping phase and the actual location determination phase. In the mapping phase (calculations of the covered area estimation) there is collected the positioning data and environment data including cell data and in the actual location determination phase (calculations of the actual location) there is collected environment data including cell data. In this way an updatable database can be generated to parameters that refer to actual positioning data and corresponding environment data, and the database can be iterated by comparing each new environment data received to parameters already existing in the database.

After the relative comparison (scoring) of the actual environment data to the environment data of the covered area estimation of each of the plurality of base stations, the server 14 is configured to select at least one base station from the plurality of base stations having the actual environment data that matches best to the environment data of the covered area estimation. The server 14 comprises selecting means 38 that can be also integrated to processor and/or memory functions of the server 14, for selecting the base stations/cells that scored best in the relative comparison taking into account the weight numbers described above. The server 14 can identify the positioning data of the covered area estimations for the selected base stations from the updatable database. Then the server 14 is configured to calculate the location of the mobile device from the positioning data of the covered area estimation of each selected at least one base station taking into account the weight numbers described above. This can be done by calculating a distance of the mobile device 10 from each selected base station. The server 14 can then transmit the location data of the mobile device to the mobile device 10 or to other device to inform the user.

With reference to the particular embodiments further incorporating 3D positioning encompassing vertical level (vertical position, 'altitude') estimation and regarding the actual location determination phase thereof, the server 14 not only calculates horizontal position based on the probability area models, but also determines a level estimate through the utilization of stored vertical level information, and where higher uncertainty exists, preferably a range of levels or otherwise a coarser estimate. The calculation is based on determining the highest weighed level or range(s) of levels interpolating towards the highest probability based on the vertical accuracy probability of each cell used. The information may be then fed to a suitable filter to avoid errors or imprecision caused by momentary variations in cell visibility, thereby allowing a stable and accurate level estimate to be maintained at all times. The filter may be configured to exploit previously determined levels and related probabilities associated with previous location estimates, preferably emphasizing, i.e. giving more weight to, the most recent level determinations over older ones.

Yet, with reference to the embodiments supporting hybrid positioning exploiting a variety of wireless technologies, the probability models are advantageously applied in true hybrid manner during the actual location determination phase to calculate the final position fix, where the models of highest accuracy and precision are given most weight regardless of their type of wireless technology, while the lower precision models will help further refine the position (yet in case of them containing unknown errors, they cannot conflict with the higher probability ones).

Still, in some potential embodiments the positioning accuracy could be further enhanced by exploiting movement profiling. Namely, when position fixes are being calculated, the cells visible to the mobile device change and vary in number due to mobile movement, for instance. The cell data used to construct the (probability) models for each position fix can be stored for a period of time and the modified models can be dynamically reconstructed based on the current movement profile obtained by a filter/estimator, such as a recursive Kalman filter/estimator, to accommodate the potential changes in position.

Combining the resulting modified models constructed with the cell data from earlier position fixes with the information of the current models allows for a higher accuracy position fix by achieving a higher removal rate of lower probability areas when the combined data is run through the locating algorithm. The filter/estimator can also be used to increase the probability of position fix calculation from the probability areas, by guiding towards a more accurate location within the already determined areas of highest probability. The location data and probability information is fed back to a filter to adjust the weighing between the estimated and calculated position.

One shall further note that in some potential embodiments, positioning may be at least temporarily or occasionally executed substantially on the basis of NMR reports, or similar data, only. To obtain the first position fix, information to preferably globally identify at least one cell of any wireless technology may be needed, typically this being the serving cell for which information is usually known, regardless of whether the positioning query is initiated by a mobile device or the base station itself (in the case of operator-end positioning).

For example, in connection with WCDMA and GSM cell data identifying the cell may include the combination of MCC, MNC, LAC and CID. Once the initial position fix has been acquired utilizing such information, sufficiently accurate information of location and network may be maintained and estimated to calculate the next position fix with NMR only, even over short breaks in obtaining the data or when the serving cell is not known or found in the database. Along with such information specific structures such as bounding volume hierarchies (tree structures on sets of geometric objects) are preferably employed to find the entries from the database in the right location based on the Network Measurement Report, or corresponding data, only. For example, regarding GSM, only ARFC and BSIC (or LAC and CID) may be sufficient for subsequent tracking after the initial position fix, for WCDMA CPICH or LAC+CID may be adequate, and for Wi-Fi only MAC may be enough to implement positioning. Signal strength (RxLev) data is preferred for providing highest positioning accuracy, though less accurate positioning is possible also without it. Overlapping cells with some shared attributes within the same bounding volume do not cause error, because the incorrect ones are filtered out by the others when fed to the locator algorithm.

Thereby, generally an initial positioning fix may be obtained utilizing a larger amount of information than the subsequent fixes. For example, in cases where even no coarse, recent (according to predetermined temporal criterion) information about the position of the mobile device is available, more data may be initially preferred to avoid potential misdetermination of the position and thus also to ascertain the accuracy of the following positioning actions utilizing lesser amount of data for the fix. In some embodiments, also the user of the mobile device may be provided with opportunity to input location information to the mobile device via the user interface thereof for facilitating positioning and acquiring e.g. the initial fix.

In a module 14 according to an embodiment of the invention in the mapping phase a receiver 36 is configured to receive and a memory 35 is configured to store the positioning data and environment data including the cell data of each of the plurality of base stations 1a, 1b, 2 associated to the position data. A processor 34 is configured to calculate for each of the plurality of base stations 1a, 1b, 2 a covered area estimation based on the positioning data and the environment data including the cell data. In the location determination phase the receiver 36 is further configured to receive actual environment data including cell data and the processor 34 is configured to relatively compare the actual environment data to the environment data of the covered area estimation of each of the plurality of base stations. A selector 38 is configured to select at least one base station from the plurality of base stations 1a, 1b, 2 that has the actual environment data that matches to the environment data of the covered area estimation. Then the processor 34 is configured to calculate the location of the mobile device from the positioning data of the covered area estimation of each selected at least one base station. The module 14 may comprise receiving means 31 for receiving various additional data such as environment data from external databases 19. All the functionality and details described in association with the server 14 in the system above is valid for the module, too.

Figure 3:
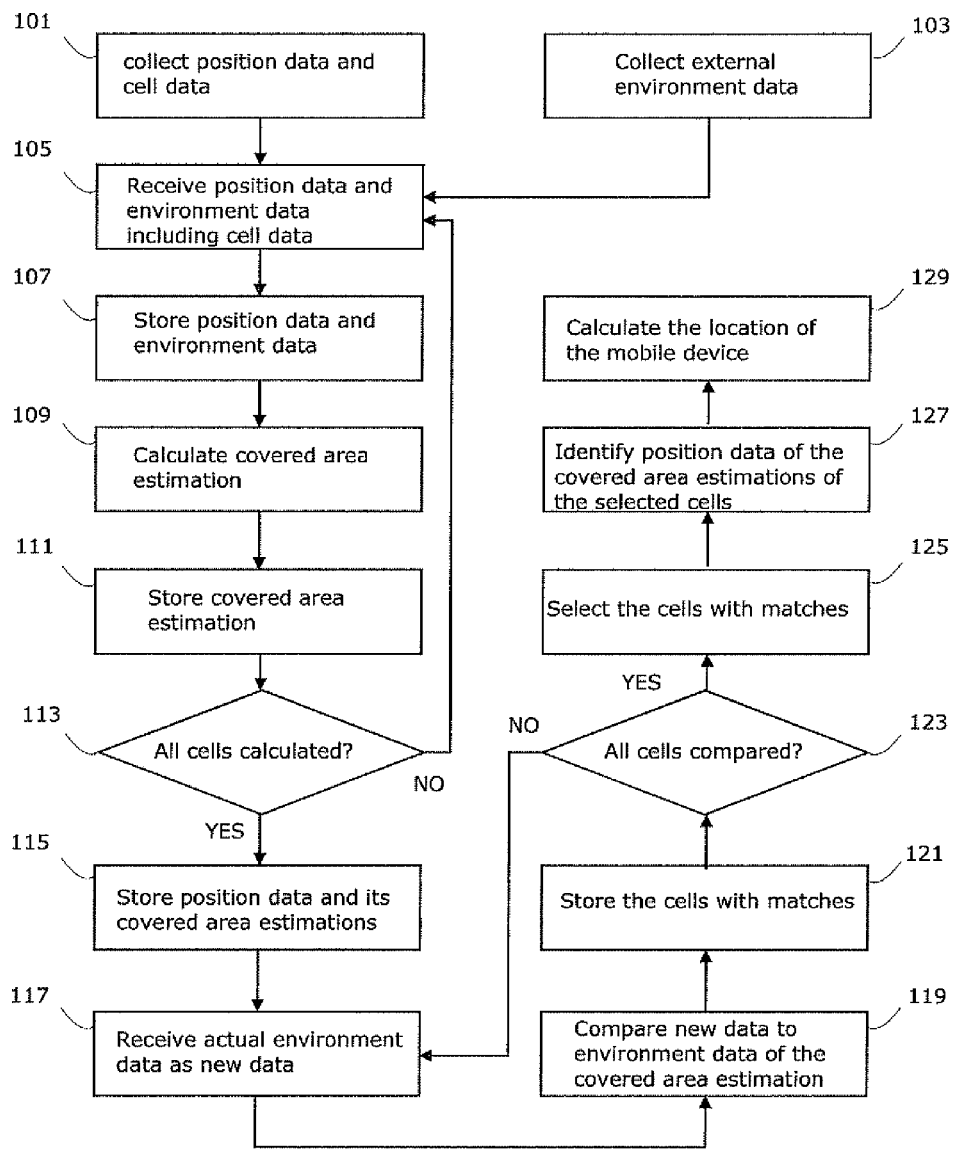
FIG. 3 depicts a flow diagram of a method according to an embodiment of the invention.

In a method according to an embodiment of the invention in order to determine a location of a mobile device 10 is next described with reference to FIG. 3. In step 101 at least positioning data and wireless communication cell data is received and transmitted further. Step 105 depicts receiving and step 107 storing the positioning data and environment data including the cell data of each of a plurality of cells 1a, 1b, 2 associated to the positioning data. Step 109 depicts calculating for each of the plurality of cells 1*a*, 1*b*, 2 *a* covered area estimation that is based on the positioning data and the environment data including the cell data. In step 111 the covered area estimation is stored. Step 113 counts that all the cells wherefrom positioning data and environment data is collected have been calculated. In step 115 depicts storing all the covered area estimations for each positioning data. In the beginning of the location determination phase step 117 depicts receiving actual environment data including cell data. Then step 119 depicts relatively comparing the actual environment data to the environment data of the covered area estimation of each of the plurality of cells. In step 121 the cells that best matches with the actual environment data are stored. One again step 123 checks that all cell have been compared. Step 125 shows selecting at least one cell from the plurality of cells having the actual environment data that matches to the environment data of the covered area estimation. Step 127 shows identifying position data of the covered area estimation for the selected cells. Finally step 129 shows calculating the location of the mobile device from the positioning data of the covered area estimation of each selected at least one cell. In steps 105 and 117 allow also reception of external environment data that is collected according to step 103. All the detailed features described in connection with the server 14 above are also valid during all corresponding method steps.

The steps 105-115 described above form a process for the mapping phase in which the covered area estimate is calculated based on the positioning data and the environment data including cell data. Steps 117-129 described above form a process for the actual location determination phase. The actual location determination process may follow the mapping phase process or it can be a separate process that is performed one or more times using the positioning data and the environment data including cell data that is resulted from a separate mapping phase process.

As alluded hereinbefore, the method may, depending on the embodiment, further incorporate at least one afore-explained enhancement selected from the group consisting of: movement profiling with filter/estimator, hybrid positioning, 3D positioning and NMR-based positioning.

In a system, method and module described above the mobile device used in the mapping phase may be another mobile device than the one used in the actual location determination phase. As an example the former mobile device may comprise the GPS receiver 3 or other positioning data receiver, and the latter mobile device may not comprise any particular positioning data receiver 3. This is because there is no need to receive any positioning data in the actual location determination phase.

In a computer program according to an embodiment of the invention there are arranged program code means that are adapted to perform any of the method steps described above when the program is run on a processor 4, 34. The program can be embedded in the processor 4, 34 of the mobile device 10 and/or the server 14.

Generally, in different embodiments of the present invention, the cells of a communications system may be modeled exploiting the gathered cell data/positioning data associations. The obtained covered area estimation models may be stored as mathematical formulae, which consumes lesser amount of storage space than many other models, for example. Indeed, each cell may be modeled via mathematical formulae from which signal-strength indicating areas and related probability areas (models) may be derived. A cell may be divided into a plurality of sectors, or sector areas, that are at least partially independently modeled. The number of sectors per cell may be dynamically determined based on the mapping results, for instance.

Figure 4:
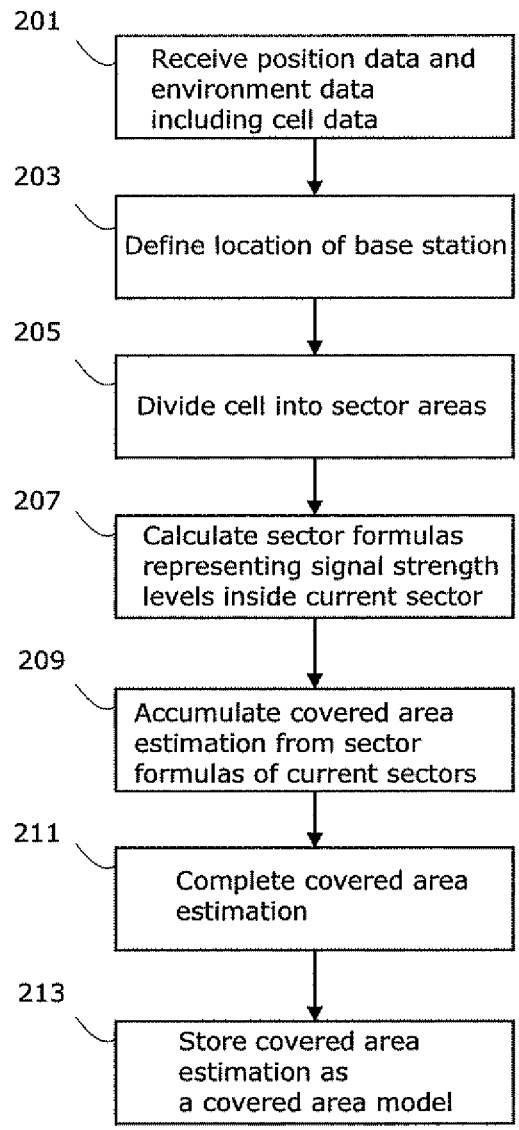
FIG. 4 depicts a flow diagram of a method according to an embodiment of the invention.

In an embodiment of the method according to an embodiment of the invention the mapping phase comprises defining a model for the covered area estimation as shown in FIG. 4. The covered area estimation model for a cell is defined based on received cell data, e.g. GSM, associated to the positioning data, e.g. GPS, step 201. According to step 203 for each cell a location of the transmitting base station is defined. According to an example shown in step 205 data comprising the received positioning data and the received cell data of each cell is divided into sector areas with respect to the location of the base station. Then in step 207 a mathematical formula of sector area is calculated for each sector area so that the sector formulas represent signal strength properties in each sector. The sector formula for each sector area is selected so that the sector formula best matches with available sector data. When calculating the sector formula environmental data including cell data is used so that information on signal behaviour as well as area specific, operator specific, country specific or global information is taken account. Therefore, the sector formula is not calculated based on received sector data only, although in addition also environmental data is used. Advantage of this is to avoid inadequate sector formulas if there is only small amount of received sector data available. The calculation process according to an embodiment guarantees that the sector formula is adequate because when defining the sector formula also information on signal behaviour as well as area specific, operator specific, country specific or global information is taken account.

In accordance to above for each divided sector area of the cell the sector formulas representing signal strength properties are defined. Based on these sector formulas and the received cell data and positioning data in step 209 there is accumulated a model of the covered area estimation for the whole cell so that the covered area estimation is composed of free-shaped probability areas for different signal strength levels within the cell. Thus, the covered area estimation of the cell is composed of probability areas according to signal strength levels, such as −75 dBm, −74 dBm, −73 dBm, etc., and at least some of these probability areas may overlap each other. Each signal strength has a set of probability areas, where each probability area describes the probability of the received signal of such signal strength being within the area. If certain inconsistencies and inadequacies are detected in the creation process of the covered area estimation after accumulating step they are corrected and the covered area estimation is completed accordingly in step 211. The model of the covered area estimation (i.e. covered area model) composed of probability areas for different signal strength levels is then stored, for example in a form of Bezier graph or polygons, to a model database 19 being connected to the server 14 according to step 213. Information received from overlapping probability areas can be used to define location data more precisely. Advantage of defining the covered area model according to an embodiment is that there is no need to store single positioning data with associated cell data to the model database 19*a* and therefore memory and processing capacity is saved both in the mapping phase as well as in the actual location calculation phase. This advantage is apparent when compared to the prior art techniques, such as signal finger printing or other frame based location systems.

In a method according to an embodiment of the invention in order to determine a location of a mobile device 10 is next described with reference to FIG. 5. In the mapping phase in step 301 at least positioning data and wireless communication cell data is received and transmitted further. Step 305 depicts storing the positioning data and environment data including the cell data of each of a plurality of cells 1a, 1b, 2 associated to the positioning data to a cell and position database 19 being connected to the server 14. Step 307 depicts calculating for each of the plurality of cells 1a, 1b, 2 a covered area estimation that is based on the positioning data and the environment data including the cell data. According to steps 203-211 of FIG. 4 the sector formulas are calculated for each sector area so that the sector formulas represent signal strength properties in each sector and the covered area estimation is accumulated from the sector formulas. Steps 303 and 309 depict selecting a piece of information from the model database 19 that matches with environmental data including cell data received from the mobile device 10. According to an embodiment said piece of information is selected from information received along the positioning data and the environmental data including cell data, such as information on a height of the transmitting base station or a width of a signal beam area of the transmitting base station. This piece of information is then used for selecting other information corresponding to the received positioning data and the environmental data including cell data that can be used to complete the covered area estimation in step 311. In step 313 the covered area estimation is stored for each position data and environmental data including cell data into the model database 19. In this way there is also provided new covered area models into the model database. Step 315 counts that all the cells wherefrom positioning data and environment data including cell data is collected have been calculated.

Figure 5:
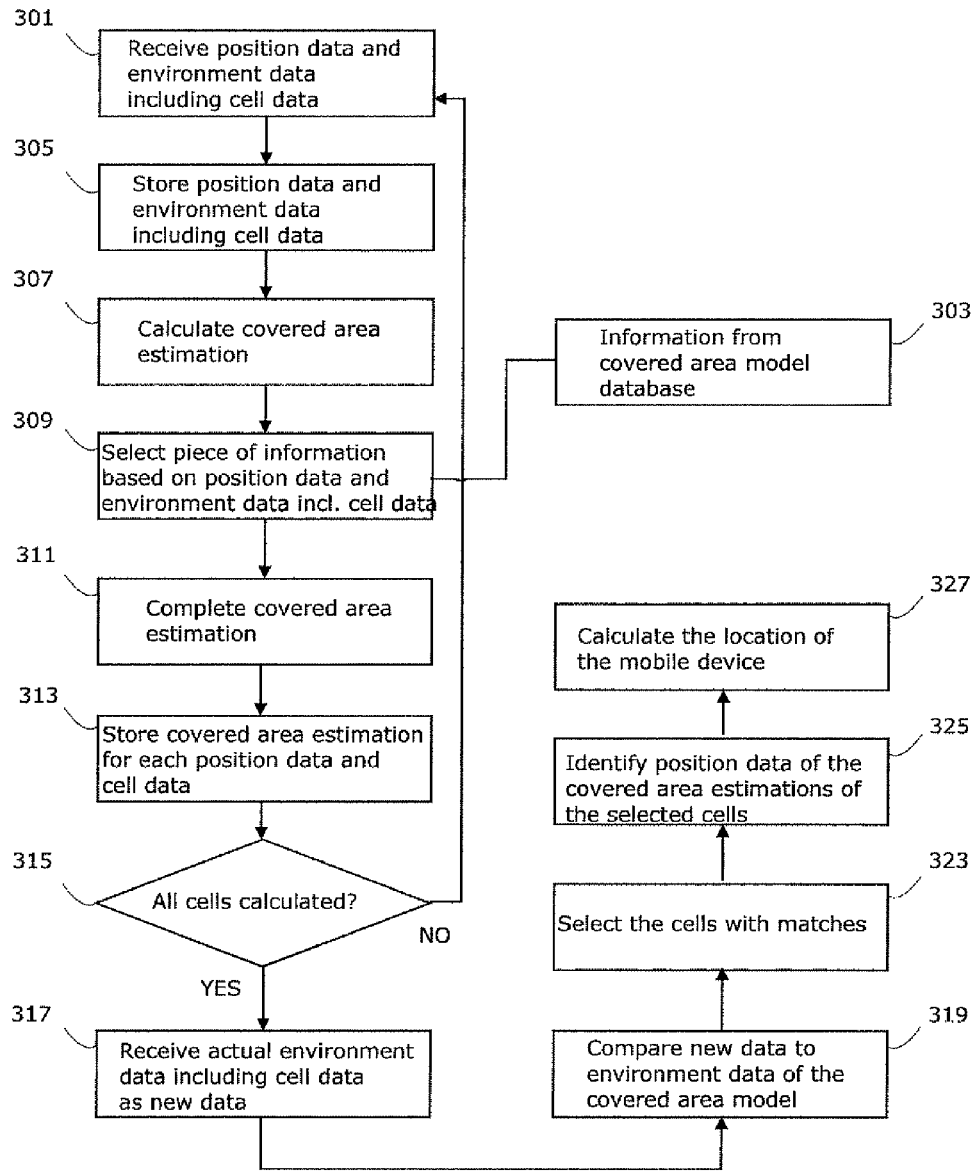
FIG. 5 depicts a flow diagram of a method according to an embodiment of the invention.

In a method according to an embodiment of the invention shown in FIG. 5 the actual location determination phase start in step 317 which depicts the mobile device 10 receiving actual environment data including cell data. The mobile device 10 can be the same device that was used in connection with the mapping phase described above or it can be another device. Then step 319 depicts relatively comparing the actual environment data including cell data to the environment data including cell data of the covered area model for each of the plurality of cells. The environment data including cell data of the covered area model is received from the model database 19 through the server 14. In step 323 the cells that best matches with the actual environment data including cell data of the covered area model are selected. Step 325 may also include prioritizing cells of the covered area estimation based on information received along the environmental data including cell data, and the prioritizing information calculated when creating the probability area models. In other words by prioritizing the relative weight of the probability areas of cells may be adjusted. In this way cell area models with low probability due to lesser mapping accuracy/precision or weaker signal strength and/or other factors and which are therefore less important in determination of the location of the mobile device 10 will add to the final position accuracy by refining the result, yet at the same time will not conflict with the area models of higher probability and cause error. In this way the covered area estimation is completed in order to determine the location of the mobile device 10. Step 325 shows identifying position data of the covered area estimation for the selected cells. Selection is based on the probability areas for different signal strength levels within each cell according to step 213 of FIG. 4. Finally step 327 shows calculating the location of the mobile device from the positioning data of the covered area estimation of each selected at least one cell. At least steps 309, 311, 319 and 325 also allow reception of positioning data and/or environment data including cell data of the covered area model from the model database 19 according to step 303. All the detailed features earlier described in connection with the server 14 are also valid during all corresponding method steps.

The steps 301-315 described above form a process for the mapping phase in which the covered area estimate is calculated based on the positioning data and the environment data including cell data. Steps 317-327 described above form a process for the actual location determination phase. The actual location determination process may follow the mapping phase process or it can be a separate process that is performed one or more times using the positioning data and the environment data including cell data that is resulted from a separate mapping phase process.

Additionally, one shall notice that the method may, depending on the embodiment, further incorporate at least one afore-explained enhancement selected from the group consisting of: movement profiling with filter/estimator, hybrid positioning, 3D positioning and NMR-based positioning.

Figure 6:
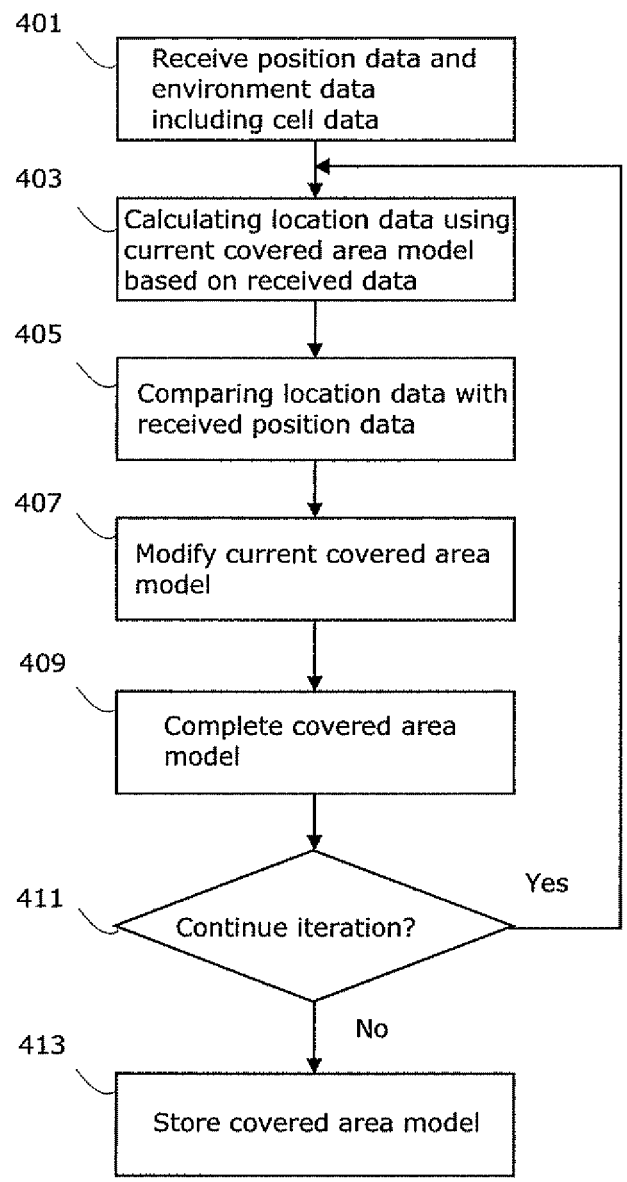
FIG. 6 depicts a flow diagram of a method according to an embodiment of the invention.

In a method according to an embodiment of the invention FIG. 6 depicts a self-learning procedure in order to improve the determination of a location of a mobile device 10. Step 401 shows receiving positioning data and environmental data including cell data from either the cell and positioning database 19 or the mobile device 10. Based on said received data and using current covered area model for said received data there is calculated location data (actual positioning data) for the mobile device 10 according to step 403. Then in step 405 said calculated location data is compared to said received positioning data in step 401. The received positioning data can be reference positioning data that is received from e.g. GPS-receiver or other positioning data source. In step 407 the current covered area model is modified to better fit with said received positioning data and said reference positioning data. Current operator, global or area specific models are also modified in step 407. In the same time current sector formulas (FIG. 3) are modified and consequently the covered area models based on said sector formulas are refined and adjusted to be more precise. Based on this in step 409 the modified covered area models are updated and completed to be more precise and better covered area models. Certain criteria for how much refining is desired for the covered area model is set in step 411. If this criteria is met then the completed covered area model is stored into the model database 19 as an updated covered area model according to step 413. If this criteria is not met and more iteration is desired then the process continues from step 411 to step 403 where the current completed covered area model in step 409 forms a basis for a next current covered area model in step 403.

Accordingly, there is thus provided a method potentially combined with other embodiment(s) of the present invention, comprising calculating for each of a plurality of cells a covered area estimation (model) based on received positioning data and received cell data, calculating location information based on the received positioning data and the calculated covered area estimation, receiving further actual positioning data and comparing the calculated location information with the received actual positioning data, completing the covered area estimation with additional data associated to the received position data and the received cell data, wherein the additional data represents at least a shape of the covered area estimation, and storing the completed covered area estimations into a database.

Each covered area estimation may be thus associated with a plurality of probability areas/probability models that describe signal probabilities, i.e. the probability of a signal of certain strength reaching a certain point/area.

Figure 7:
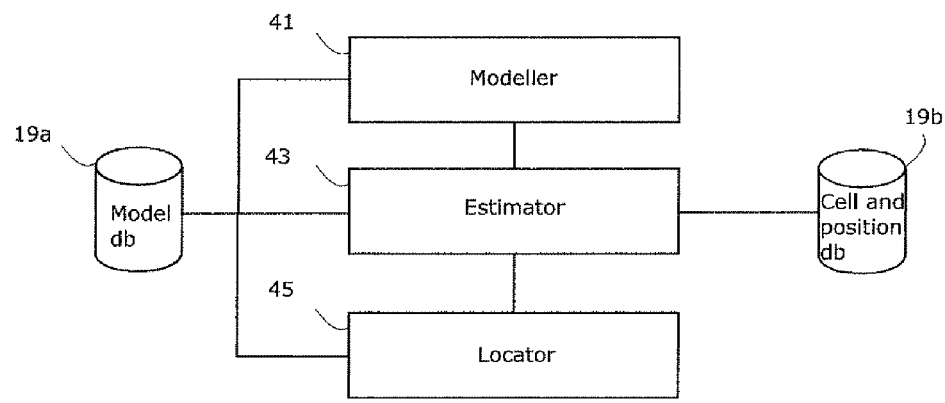
FIG. 7 depicts a block diagram of a module according to an embodiment of the invention.

In a system according to an embodiment of the invention shown in FIG. 7 there is provided a database 19b for storing environmental data including cell data and position data received from the mobile device 10. There is also provided at least a logical entity that may be called estimator 43 for calculating covered area estimation for each cell of the plurality of cells 1a, 1b, 2 a based on the positioning data and the environment data including the cell data. The estimator 43 calculates (according to steps 203-211 of FIG. 4) the sector formulas for each sector area so that the sector formulas represent signal strength properties in each sector. A modeler 41 accumulates the covered area estimation from the sector formulas and from the received cell data and positioning data. The modeler 41 selects a piece of information from the model database 19a that matches with environmental data including cell data received from the mobile device 10. According to an embodiment said piece of information is selected from information received along the positioning data and the environmental data including cell data, such as frequency scale determined from the ARFCN values so that the modeler 41 can complete the covered area estimation. The modeler 41 transmits the covered area estimation into the model database 19a to store the covered area estimation. In this way there are also stored updated covered area models into the model database 19a. Depending on the embodiment, the actions executed by the estimator 43 and modeler 41 may be naturally combined to be performed by a common logical entity, such as a common 'modeler', or alternatively, further split for execution by a greater number of logical entities, as being understood by a skilled reader. The shown functional division is mainly for the purposes of illustration. In a system there is further provided a locator 45 for calculating the location of the mobile device 10 based on the environmental data including cell data. The locator 45 may be configured to derive signal-strength indicating areas and related probability areas based on the formulae of the covered area estimations upon need.

A server 14 according to an embodiment of the invention shown in FIG. 1b comprises at least one of the following: a modeler 41, an estimator 43 and a locator 45 shown in FIG. 7. In a server 14 a module according to an embodiment of the invention shown in FIG. 1b comprises at least one of the following: a modeler 41, an estimator 43 and a locator 45 shown in FIG. 7. A system according to an embodiment of the invention shown in FIG. 2 comprises a server 14 comprising at least one of the following: a modeler 41, an estimator 43 and a locator 45 shown in FIG. 7.

Figure 8:
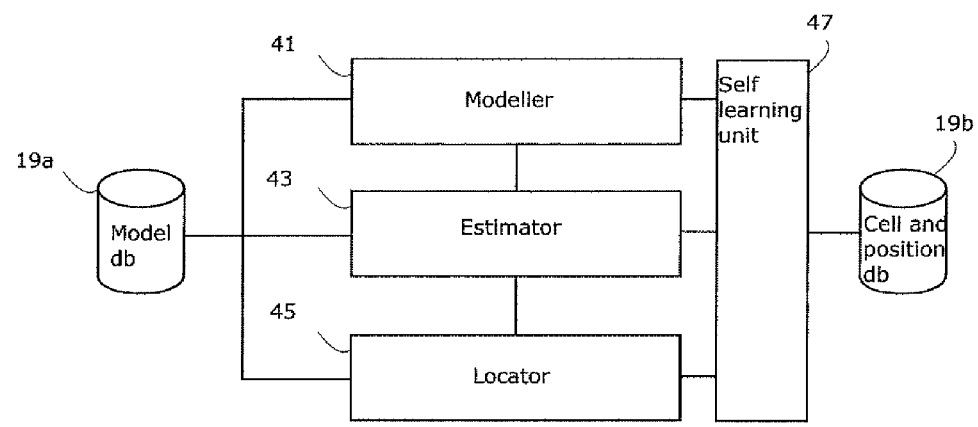
FIG. 8 depicts a block diagram of a module according to an embodiment of the invention.

In a system according to an embodiment of the invention shown in FIG. 8 there is provided a self-learning unit 47 for improving the determination of a location of a mobile device 10. The self-learning unit 47 receives environmental data including cell data and position data either from a cell and positioning database 19b or from the mobile device 10. Then the self-learning unit 47 starts the self-learning procedure. Based on said received data and using current covered area model for said received data a locator 45 calculates location data (actual positioning data) for the mobile device 10. Then the self-learning unit 47 compares said calculated location data to said received positioning data. The received positioning data can be reference positioning data that is received from e.g. GPS-receiver or other positioning data source. The self-learning unit 47 modifies in cooperation with an estimator 43 the sector formulas (FIG. 3) to better fit with said received positioning data. Together with a modeler 41 self-learning unit 47 updates and completes the modified covered area models to be more precise and better covered area models. The self-learning unit 47 continues iteration circles together with the modeler 41, estimator 43 and locator 45 until certain preset criteria for how much refining is desired for the covered area model is met. If this criteria is met then the self-learning unit 47 transmits the completed covered area model to the model database 19a as an updated covered area model and the model database 19a stores the updated covered area model.

Accordingly, a module may be provided, potentially combined with other embodiment(s) of the present invention, comprising a self-learning unit configured to communicate with a locator in order to calculate for each of a plurality of cells a covered area model based on received positioning data and received cell data, communicate with an estimator in order to calculate location information based on the received positioning data and the calculated covered area model, receive further actual positioning data, communicate with the estimator in order to compare the calculated location information with the received actual positioning data, communicate with a modeler in order to complete the covered area model with additional data associated to the received position data and the received cell data, wherein the additional data represents at least a shape of the covered area estimation, and transmit the completed covered area model into a database for storing.

The self-learning unit may also be adapted to run without a reference position, by detecting inconsistencies in the data and, for instance, refining the probability values and other factors of the probability areas, as well as detecting where changes to the wireless network have happened and report those to the administrator of the system or other entities.

A server 14 according to an embodiment of the invention shown in FIG. 1b comprises at least one of the following: a modeler 41, an estimator 43, a locator 45 and a self-learning unit 47 shown in FIG. 8. In a server 14 a module according to an embodiment of the invention shown in FIG. 1b comprises at least one of the following: a modeler 41, an estimator 43, a locator 45 and a self-learning unit 47 shown in FIG. 7. A system according to an embodiment of the invention shown in FIG. 2 comprises a server 14 comprising at least one of the following: a modeler 41, an estimator 43, a locator 45 and a self-learning unit 47 shown in FIG. 7.

In some embodiments, the mobile device may be substantially self-contained as to the databases (or similar repositories) and processing capability required for positioning, and thus it may implement the necessary portions of the module as described herein to substantially autonomously position itself based on the received cell data. At least the locator 45 entity shall be provided in the mobile device with a local database (data repository) that could be initially downloaded from a network or provided on a carrier medium such as memory card. The database may include the necessary covered area estimations/model(s) represented as e.g. mathematical formulae as described hereinbefore to enable dynamically linking cell data with corresponding position using the locator 45.

In some embodiments, the mobile device may generally implement the functionalities of the server as presented herein. Accordingly, the mobile device may further incorporate e.g. the aforesaid estimator 43 and modeler 41, optionally also self-learning 47, components.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by scope of the claims appended hereto.

The invention claimed is:

1. A method for determining a location of a mobile device configured to receive and transmit further at least positioning data and wireless communication cell data, the method comprising
    calculating for each of a plurality of cells a covered area estimation based on the received positioning data and the received cell data,
    completing the covered area estimation with additional data associated to the received positioning data and the received cell data, wherein the additional data represents at least a shape of the covered area estimation, and wherein the covered area estimation incorporates vertical level information,
    receiving further actual cell data and relatively comparing the actual cell data to the cell data of the covered area estimation of each of the plurality of cells,
    selecting at least one cell from the plurality of cells having the actual cell data that matches to the cell data of the covered area estimation, and
    calculating the location of the mobile device through the utilization of the positioning data of the covered area estimation of each selected cell, wherein an estimate of the vertical position of the mobile device is further determined.

2. The method according to claim 1, wherein said positioning data includes vertical level information.

3. The method according to claim 1, wherein said additional data comprises vertical level information.

4. The method according to claim 1, wherein the vertical level information is based on satellite positioning data, optionally GPS (Global Positioning System) or GLONASS (Global Navigation Satellite System) data.

5. The method according to claim 1, wherein covered area estimations are established relative to a plurality of different wireless network technologies and the location of the mobile device is determined utilizing at least two covered area estimations of different wireless network technology.

6. The method according to claim 1, wherein covered area estimations are established relative to a plurality of different wireless network technologies and the location of the mobile device is determined utilizing at least two covered area estimations of different wireless network technology, and further wherein said plurality of wireless network technologies includes at least one cellular phone network of first technology and wireless LAN (local area) network or one other cellular phone network of second technology.

7. The method according to claim 1, wherein the actual cell data substantially consists of data provided in a network measurement report.

8. The method according to claim 1, wherein the actual cell data substantially consists of data provided in a network measurement report, and further wherein based on data provided in the report matching cells are determined and the position of the mobile device calculated.

9. The method according to claim 1, wherein the movement of the mobile device is profiled to increase the positioning accuracy utilizing a recursive filter or estimator, optionally Kalman filter or estimator.

10. The method according to claim 1, wherein completing comprises updating the cell data of the covered area estimation with the additional data that relates to the shape of the covered area estimation based on probability of signal strength within each of the plurality of cells.

11. The method according to claim 1, wherein calculating the covered area estimation comprises calculating a location of a transmitting base station of each cell.

12. The method according to claim 1, comprising dividing each of the plurality of cells into sector areas and calculating for each sector area a sector formula representing signal strength levels inside the sector area and accumulating the covered area estimation from the sector formulas.

13. The method according to claim 1, wherein calculating the covered area estimation comprises calculating a transmission range of a transmitting base station of each cell.

14. The method according to claim 1, wherein calculating the covered area estimation comprises calculating a size and shape of each cell based on at least one of the following cell data: radio frequency, absolute radio frequency channel number, receiver signal strength and timing advance.

15. The method according to claim 1, wherein the environment data includes information on signal loss over various ranges, number of base stations and type of base stations.

16. The method according to claim 1, wherein the additional data includes at least one of the following information relating to cell identification, mobile area code, location area code, mobile country code, global or operator specific information.

17. The method according to claim 1, wherein the additional information relates to at least one of the following information received from databases: population density, land topography and city size.

18. A system for determining a location of a mobile device, wherein
    the mobile device is configured to collect and transmit further at least positioning data and wireless communication cell data received from a plurality of base station belonging to at least one cellular network,
    a server is configured to receive and store the positioning data and the cell data of each of the plurality of base stations associated to the position data,
    the server is configured to calculate for each of the plurality of base stations a covered area estimation based on the positioning data and the cell data,
    the server is configured to complete the covered area estimation with additional data associated to the received position data and the received cell data, wherein the additional data represents at least a shape of the covered area estimation, and wherein the covered area estimation incorporates vertical level information,
    the server is configured to further receive the cell data and the processor is configured to relatively compare the actual cell data to the cell data of the covered area estimation of each of the plurality of base stations,
    the server is configured to select at least one base station from the plurality of base stations having the actual cell data that matches to the cell data of the covered area estimation,
    the server is configured to calculate the location of the mobile device from the positioning data of the covered area estimation of each selected at least one base station, wherein the location comprises an estimate of the vertical position of the mobile device, and the server configured to transmit further the location of the mobile device.

19. The system according to claim 18, wherein the server is configured to complete the cell data of the covered area estimation with the additional data that relates to the shape of the covered area estimation based on probability of signal strength within each of the plurality of cells.

20. The system according to claim 18, wherein the server is configured to calculate a location of a transmitting base station of each cell.

21. The system according to claim 18, wherein the server is configured to divide each of the plurality of cells into sector areas and calculate for each sector area a sector formula representing signal strength levels inside the sector area and accumulate the covered area estimation from the sector formulas.

22. The system according to claim 18, wherein the server is configured to calculate for each of a plurality of cells a covered area model based on received positioning data and received cell data, calculate location information based on the received positioning data and the calculated covered area model, receive further actual positioning data and compare the calculated location information with the received actual positioning data, complete the covered area model with additional data associated to the received position data and the received cell data, wherein the additional data represents at least a shape of the covered area estimation, and transmit the completed covered area model into a database for storing.

23. A module for determining a location of a mobile device configured to receive and transmit further at least positioning data and wireless communication cell data, the module comprising a receiver configured to receive and a memory configured to store the positioning data and the cell data of each of the plurality of base stations associated to the position data, an estimator configured to calculate for each of the plurality of base stations a covered area estimation based on the positioning data and the cell data, a modeler configured to complete the covered area estimation with additional data associated to the received position data and the received cell data, wherein the additional data represents at least a shape of the covered area estimation, and wherein the covered area estimation incorporates vertical level information, a locator configured to further receive actual cell data, the estimator configured to relatively compare the actual cell data to the cell data of the covered area estimation of each of the plurality of base stations, a selector configured to select at least one base station from the plurality of base stations having the actual cell data that matches to the cell data of the covered area estimation, and the locator configured to calculate the location of the mobile device from the positioning data of the covered area estimation of each selected at least one base station, wherein the location comprises an estimate of the vertical position of the mobile device.

24. The module according to claim 23, wherein the modeler is configured to complete the cell data of the covered area estimation with the additional data that relates to the shape of the covered area estimation based on probability of signal strength within each of the plurality of cells.

25. The module according to claim 23, wherein the modeler is configured to calculate a location of a transmitting base station of each cell.

26. The module according to claim 23, wherein the modeler is configured to divide each of the plurality of cells into sector areas and calculate for each sector area a sector formula representing signal strength levels inside the sector area and accumulate the covered area estimation from the sector formulas.

27. A mobile device operable in at least one wireless communications network, comprising a model database containing a covered area estimation regarding a plurality of base stations of the at least one network, wherein the covered area estimation associates cell data with positioning data and indicates the shape of the covered area, further incorporating vertical level information, and a locator configured to receive cell data and further configured to relatively compare the received cell data to the cell data of the covered area estimation of each of the plurality of base stations, to select at least one base station from the plurality of base stations with matching cell data, and to calculate the location of the mobile device from the positioning data of the covered area estimation of each selected at least one base station, wherein the location comprises an estimate of the vertical position of the mobile device.

* * * * *